United States Patent
Soryal et al.

(10) Patent No.: US 11,502,997 B1
(45) Date of Patent: Nov. 15, 2022

(54) DEVICE NETWORK MAPPING OBSCURATION

(71) Applicant: AT&T Intellectual Property I, L.P., Atlanta, GA (US)

(72) Inventors: Joseph Soryal, Glendale, NY (US); Naila Jaoude, Eatontown, NJ (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 17/307,976

(22) Filed: May 4, 2021

(51) Int. Cl.
*H04L 29/06* (2006.01)
*H04L 9/40* (2022.01)
*H04L 12/46* (2006.01)

(52) U.S. Cl.
CPC ...... *H04L 63/0272* (2013.01); *H04L 12/4641* (2013.01); *H04L 63/0407* (2013.01); *H04L 63/0428* (2013.01)

(58) Field of Classification Search
CPC ............. H04L 63/0272; H04L 63/0407; H04L 63/0428; H04L 12/4641
See application file for complete search history.

(56) References Cited

U.S. PATENT DOCUMENTS

| | | | |
|---|---|---|---|
| 7,093,288 B1* | 8/2006 | Hydrie | H04L 63/0263 709/227 |
| 9,769,046 B2* | 9/2017 | Sabin | H04L 43/10 |
| 2019/0141572 A1* | 5/2019 | Zaks | H04W 12/106 |
| 2019/0196837 A1* | 6/2019 | Gagnon | G06F 9/45558 |
| 2020/0272431 A1* | 8/2020 | Chiosi | H04L 41/40 |

OTHER PUBLICATIONS

T. Moghaddam, Mahyar & Muccini, Henry. (2019). Fault-Tolerant IoT: A Systematic Mapping Study. 10.1007/978-3-030-30856-8_5. (Year: 2019).*

* cited by examiner

*Primary Examiner* — Chau Le
(74) *Attorney, Agent, or Firm* — Hartman & Citrin LLC

(57) ABSTRACT

A sender device can determine that data associated with an application is to be sent to a service via a network. The sender device can generate resource queries directed to at least two participant devices and receive responses indicating whether each of the participant devices has a resource available to host a virtual network function ("VNF"). The sender device can generate commands directed to security interface applications executed by the participant devices. The commands can instruct the participant devices to instantiate the VNFs. The sender device can partition the data into data partitions directed to the participant devices. The sender device can send the data partitions to the VNFs of the participant devices. The VNFs can forward the data partitions to a network access device that can combine the data partitions and send the data to the service via the network.

20 Claims, 6 Drawing Sheets

DEVICE NETWORK MAPPING OBSCURATION

BACKGROUND

The Internet of Things ("IoT") is a concept of making physical objects, collectively "things," network addressable to facilitate interconnectivity for the exchange of data. IoT represents a significant business opportunity for service providers. Industry standards for the IoT infrastructure are currently in flux. To realize the lucrative promise of this new industry, issues associated with network capacity, forensic accountability, and data security must be addressed.

Many devices that we use every day, such as home appliances, lighting, doorbells, baby monitors, camera, locks, sprinkler systems, thermostats, and the like are now equipped with network interfaces to communicate via Wi-Fi and/or cellular as IoT devices. Low-powered cellular base stations, such as microcells, are often deployed alongside IoT devices in areas that have poor or no cellular signal strength to enable network connectivity in the absence of Wi-Fi connectivity. Since IoT devices and microcells are typically densely deployed in sensitive areas (e.g., homes and businesses), these devices can be a target for malicious attackers to gain insightful information about the physical layout of the area and the exact location(s) of the devices. This can lead to the devices being compromised, data being stolen, and/or the safety of individuals in the area being compromised.

SUMMARY

Concepts and technologies disclosed herein are directed to device network mapping obscuration. According to one aspect of the concepts and technologies disclosed herein, a sender device can include a processor and a memory. The memory can include computer-executable instructions of a first security interface application that, when executed by the processor, cause the processor to perform operations. In particular, the first security interface application can determine that data associated with an application is to be sent to a service via a network. The network can be accessible by the sender device via a network access device such as a WI-FI and/or cellular network access device. In response to determining that the data associated with the application is to be sent to the service via the network, the first security interface application can generate a first resource query directed to a first participant device and a second resource query directed to a second participant device. The first resource query can cause the first participant device to respond with a first resource query response indicating whether the first participant device has a first resource capable of hosting a first virtual network function ("VNF"). The second resource query can cause the second participant device to respond with a second resource query response indicating whether the second participant device has a second resource capable of hosting a second VNF. The first security interface application can send the first resource query to the first participant device and the second resource query to the second participant device. The first security interface application can receive the first resource query response indicating that the first participant device has the first resource capable of hosting the first VNF and the second resource query response indicating that the second participant device has the second resource capable of hosting the second VNF. The first security interface application can generate a first command directed to a second security interface application associated with the first participant device and a second command directed to a third security interface application associated with the second participant device. The first command can instruct the first participant device to instantiate the first VNF using the first resource and the second command instructs the second participant device to instantiate the second VNF using the second resource. The first security interface application can send the first command to the first participant device and the second command to the second participant device. The first participant device can instantiate the first VNF in accordance with the first command. The second participant device can instantiate the second VNF in accordance with the second command. The first security interface application can partition the data into a first data partition directed to the first participant device and a second data partition directed to the second participant device. The first security interface application can send the first data partition to the first VNF of the first participant device and the second data partition to the second VNF of the second participant device. The first participant device can forward, via the first VNF, the first data partition to the network access device. The second participant device can forward, via the second VNF, the second data partition to the network access device. The network access device can combine the first data partition and the second data partition and send the data to the service via the network.

In some embodiments, the sender device also can include a security interface component, such as a secure element. The security interface component can include the processor and the memory. In these embodiments, the sender device also can include a device processor and a device memory. The device memory can include computer-executable instructions of the application that, when executed by the device processor, cause the device processor to generate the data.

In some embodiments, the first command can further instruct the first participant device to instantiate a first network randomizer engine in the first VNF and the second command can further instruct the second participant device to instantiate a second network randomizer engine in the second VNF. In some embodiments, the first security interface application can determine an exclusionary data traffic characteristic. The exclusionary data traffic characteristic can instruct the first network randomizer engine and the second network randomizer engine to exclude a data traffic characteristic. The first security interface application can send the exclusionary data traffic characteristic to the first network randomizer engine and the second network randomizer engine.

In some embodiments, the first security interface application can encrypt the first data partition and the second data partition prior to sending the data partitions to the VNFs. In some embodiments, the first security interface application can encrypt the first data partition using a first key and the second data partition using a second key. The first security interface application can provide the first key to the second security interface application and the second key to the third security interface application.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
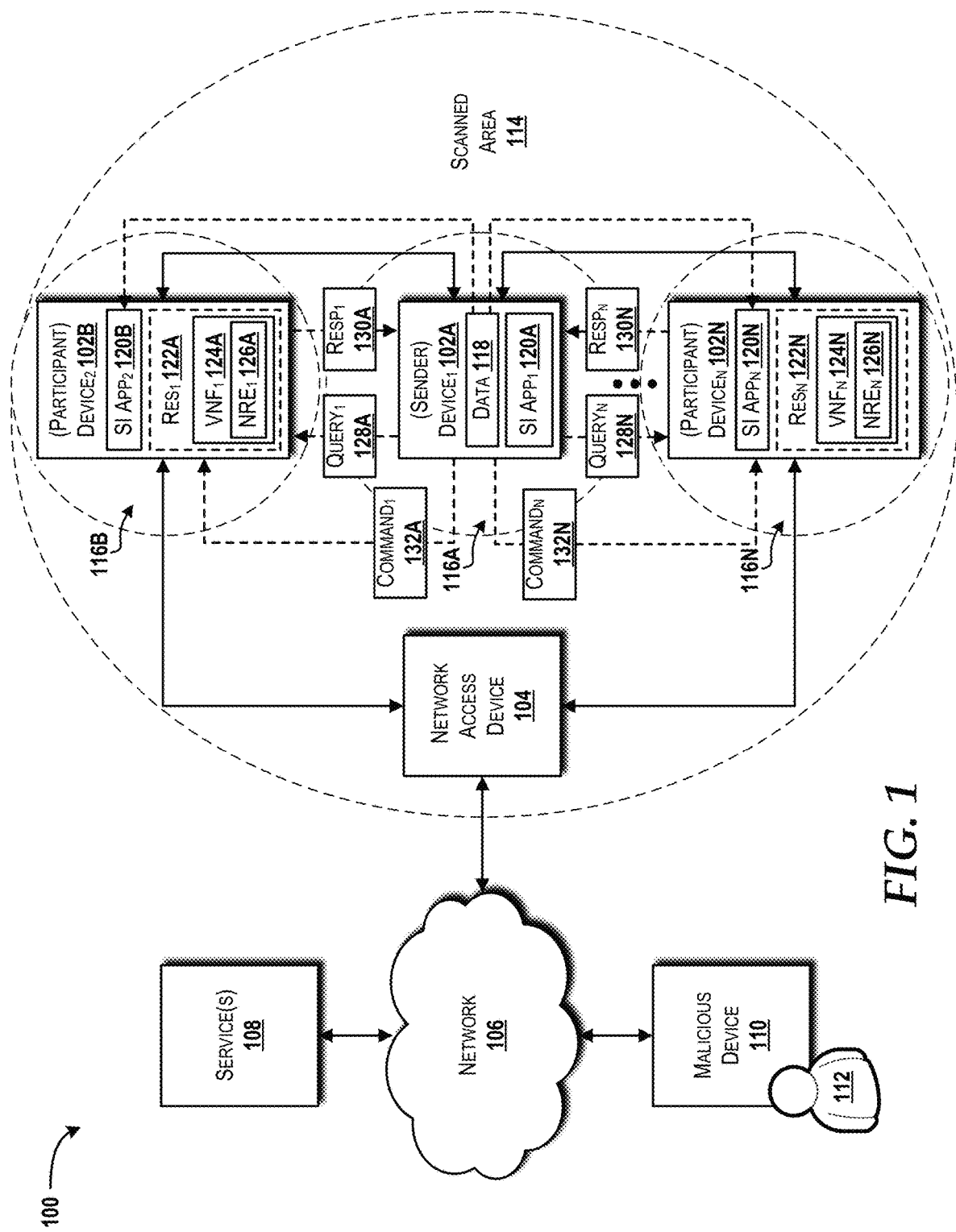
FIG. 1 is a block diagram illustrating an illustrative operating environment in which aspects of the concepts and technologies disclosed herein can be implemented in accordance with various embodiments of the concepts and technologies described herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of the concepts and technologies disclosed herein for device network mapping obscuration will be described.

Referring now to FIG. 1, aspects of an illustrative operating environment 100 in which aspects of the concepts and technologies disclosed herein can be implemented will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes a plurality of devices 102A-102N (hereinafter, at times, collectively referred to as "devices 102" or individually as "device 102"), including a first device ("device$_1$") 102A, a second device ("device$_2$") 102B, and an $n^{th}$ device ("device$_n$") 102N. The devices 102 can be or can include one or more IoT devices. The devices 102 additionally or alternatively can include one or more small cell base stations (e.g., microcell, picocells, or femtocells). The devices 102 can include other connected devices, including, for example, computers, smartphones, tablets, other computing devices, combinations thereof, and the like. The devices 102 can be deployed for consumer use, business use, government use, and can find application in many industry-specific use cases. For example, the devices 102 may find at least partial application in the following industries: automotive, energy, healthcare, industrial, retail, and smart buildings/homes. For purposes of explanation, and not limitation, the devices 102 will be considered IoT devices operating in a smart home or business. Those skilled in the art will appreciate the applicability of IoT-solutions disclosed herein to other industries as well as consumer and business use cases. For this reason, the applications of the devices 102 described herein are used merely to illustrate some example applications, and therefore should not be construed as being limiting in any way.

Figure 5:
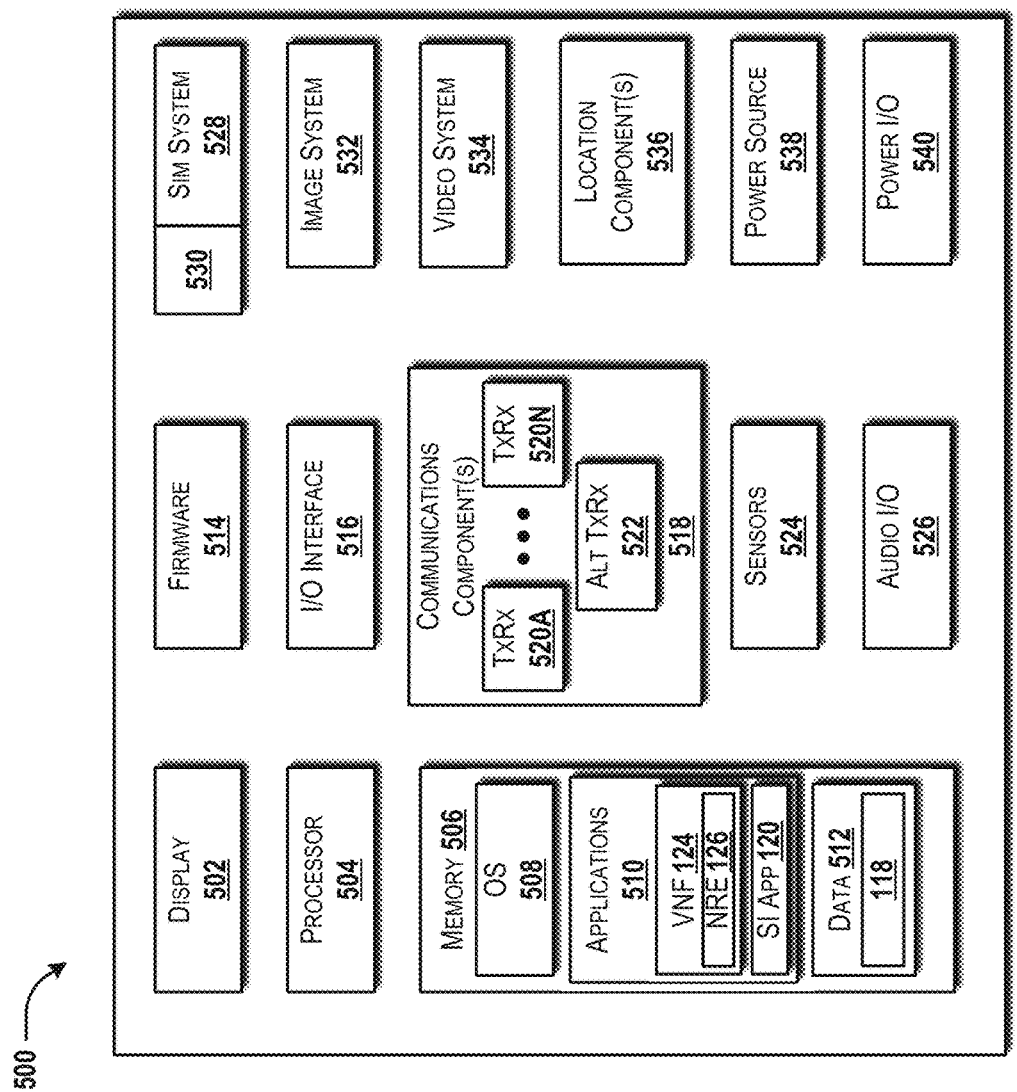
FIG. 5 is a block diagram illustrating an example mobile device capable of implementing aspects of the embodiments disclosed herein.
Figure 6:
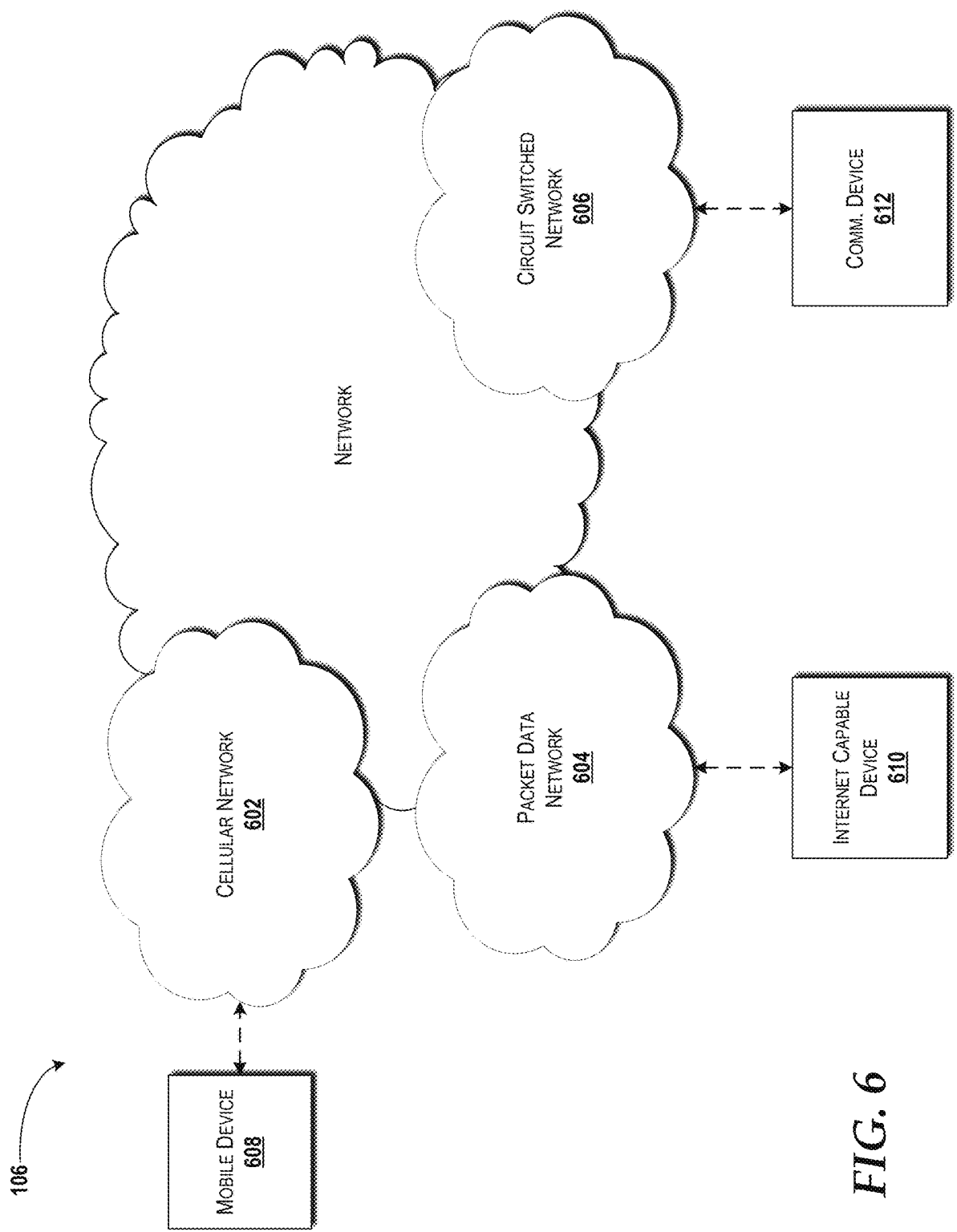
FIG. 6 is a diagram illustrating a network, according to an illustrative embodiment.

Each of the devices 102 can be configured to operate in communication with a network access device 104 that provides access to a network 106 (see FIG. 6 for additional details). The network access device 104 can be any device capable of providing, at least in part, the devices 102 with connectivity to the network 106. In some embodiments, the network access device 104 is or includes a modem that enables connectivity to the network 106 embodied as a wireline network (e.g., cable or fiber) and/or a wireless network (e.g., cellular). The network access device 104 can include other functionality such as routing, switching, and the like for a local area network ("LAN"; not shown) that can serve the devices 102 and, in some instances, other devices (not shown). An exemplary embodiment of the network 106 is illustrated and described herein with reference to FIG. 5.

The devices 102 can communicate among each other using technologies such as Institute of Electrical and Electronics Engineers ("IEEE") 802.15.1 (commonly known as BLUETOOTH low energy or BLE), IEEE 802.11ah (Ha-Low), other short-range communications technologies, other IoT-specific technologies, IEEE 802.11 (wireless LAN) technologies, combinations thereof, and the like. It should be understood that as IoT technologies continue to mature, new communications protocols likely will be developed and improve upon existing technologies. The concepts and technologies disclosed herein are not limited to any particular technology(ies). Accordingly, the example technologies described herein should not be construed as being limiting in any way.

The network 106 allows the devices 102 to access one or more services 108 (hereinafter referred to collectively as "services 108" or individually as "service 108"). The services 108 can provide functionality to the devices 102. For example, the device 102 embodied as a smart thermostat may communicate with the service 108 to obtain temperature, humidity, and/or other settings to enable a user (not shown) to view and manage these settings from a remote device such as a smartphone (also not shown). Those skilled in the art will appreciate that the services 108 can include any services utilized, at least in part, by the devices 102. Accordingly, the example services 108 described herein should not be construed as being limiting in any way.

In the illustrated example, a malicious device 110 associated with a malicious attacker 112 (e.g., a hacker) can scan an area (e.g., a home or other building) 114 (shown as "scanned area") that contains the devices 102 in order to acquire a location 116 for each of the devices 102. In particular, the device$_1$ 102A is associated with a first location 116A, the device$_2$ 102B is associated with a second location 116B, and the device$_n$ 102N is associated with an n$^{th}$ location 116N. The locations 116A-116N may be various locations within a home or other building or various locations of different homes/buildings. Based on the type(s) of the devices 102 and/or other information associated with the devices 102, the malicious device 110 can determine the locations 116 of the devices 102. For example, the device$_2$ 102B may be a baby monitor, the location 116B of which can be indicative of where a child sleeps. The malicious device 110 may jam, mimic, or otherwise compromise the device$_2$ 102B. In the baby monitor example, the malicious attacker 112 may inject other audio and/or video to be output by the baby monitor and/or accessory device (e.g., a remote associated with the baby monitor). The locations 116 of the devices 102 may be used by the malicious attacker 112 to commit a physical attack on the devices 102, occupants of the scanned area 114, and/or to commit other crimes.

The concepts and technologies disclosed herein enable the obscuration of device network mapping among the devices 102, and thereby the locations 116 of the devices 102 from entities such as the malicious attacker 112. In the illustrated example, the device$_1$ 102A is operating as a sender device (hereinafter, at times, referred to as "sender device 102A") that needs to send data 118 to the network 106 via the network access device 104. The data 118 can be associated, for example, with one or more of the services 108, although other data is contemplated. Rather than send the data 118 directly to the network access device 104, the sender device 102A can send portions of the data 118 to the device$_2$ 102B and the device$_n$ 102N (hereinafter, at times, referred to as "participant devices 102B-102N"). It should be understood that the sender device 102A may send all of the data 118 to one of the participant devices 102B-102N or split the data 118 among any number of participant devices 102B-102N.

Each of the devices 102A-102N is associated with a security interface ("SI") application 120. In some embodiments, the SI application 120 is stored on a secure element (not shown) and is executed by the secure element independent of any processing component(s) (best shown in FIGS. 3-5) of the device 102. Although some implementations of the SI application 120 may be executed natively by the device 102, implementations that allow the SI application 120 to be executed independently such as by a secure element can increase the overall security of the implementation.

Each of the participant devices 102B-102N can have available resources 122A-122N, respectively, that can be used by the sender device 102A to instantiate virtual network functions ("VNFs") 124A-124N (hereinafter, at times, referred to collectively as "VNFs 124" or individually as "VNF 124"), respectively. In some embodiments, the participant devices 102B-102N can host more than one VNF 124 that are logically separated from each other. The resources 122A-122N (hereinafter, at times, referred to collectively as "resources 122" or individually as "resource 122") can include compute resources, memory resources, and other resources to be used by the VNFs 124 to perform operations described herein. Examples of the resources 122 include components of an IoT device 300 illustrated and described with reference to FIG. 3, components of a computer system 400 illustrated and described with reference to FIG. 4, and components of a mobile device 500 illustrated and described with reference to FIG. 5.

The VNFs 124 can function as a networking interface through which the participant devices 102B-102N, at the instruction of the SI applications 120, can forward the portions of the data 118 to the network access device 104. The network access device 104 can send the data 118 to the network 106 that, in turn, can route the data 118 to the service 108.

Each of the VNFs 124 can include a network randomizer engine ("NRE") 126A-126N (hereinafter, at times, referred to collectively as "NREs 126" or individually as "NRE 126"). The NREs 126 can create random data traffic characteristics to be applied to packets of the data 118. In this manner, packet transmission by each of the participant devices 102B-102N can be changed so that packets of the data 118 experience random data traffic characteristics such as, for example, transmission delays, queuing delays, throughput changes, packet order changes, transmission power level changes, changes to other data traffic characteristics, combinations of any of the aforementioned data traffic characteristics, and the like. In some embodiments, the sender device 102A can inform the NREs 126 of exclusionary data traffic characteristics such as specific values or ranges of data traffic characteristics that the NREs 126 should avoid. For example, the sender device 102A may inform the NREs 126 to avoid similar transmission delays that would have occurred if the sender device 102A had sent the data 118 directly to the network access device 104.

The SI application$_1$ 120A can encrypt the data 118 before forwarding the data 118 (or portions thereof) to the participant devices 102B-102N. The SI application$_1$ 120A can establish a main encryption key (MAIN-KEY) with the network access device 104 and separate encryption keys (VNF_KEY_N) between the SI application$_1$ 120A and the VNFs 124A-124N. An example sequence of encryptions will now be described. First, the sender device 102A, via the SI application$_1$ 120A, can encrypt packets of the data 118 using the MAIN-KEY previously exchanged with the network access device 104. Next, the sender device 102A, via the SI application$_1$ 120A, can encrypt packets of the data 118 using a specific VNF encryption key. For example, the packets can be encrypted using a VNF_KEY_1 for the packets destined for the VNF$_1$ 124A and a VNF_KEY_N for packets destined for the VNF$_N$ 124N. Each of the VNFs 124 can decrypt the packets using the appropriate key and send the packets to the network access device 104.

In some embodiments, the SI applications 120 can function as a honey pot. When the participant devices 102B-102N are idle (i.e., not functioning as transmitter to other devices), the SI applications 120 can transmit traffic patterns for other devices (i.e., spoof the traffic patterns of other valid devices) in an attempt to attract hackers. For example, the SI application 120 can spoof a baby monitor traffic pattern, broadcast this traffic pattern over a wireless frequency or range of wireless frequencies, and analyze any responses to determine whether the malicious device 110 is scanning the wireless frequency range or attempting to respond. In some embodiments, the SI applications 120 can run preliminary analysis that is suitable for limited power and resources of the devices 102. In some other embodiments, the SI applications 120 can report traffic and associated patterns to a backend server (not shown) for more detailed analysis. Also, any of the SI applications 120 can alert other SI applications 120 to try and pinpoint the geographical location of the malicious device 110 and generate an alarm/notification (e.g., email, text message, audio alert such as a beep, or the like) to the user.

The SI applications 120 can be aware of the locations 116 of the other SI applications 120. The SI applications 120 cannot be tied, via name or functionality, to a host device. In other words, although the SI application$_2$ 120B may be part of an independent component (e.g., a secure element), the participant device 102B is unaware of the SI application$_2$ 120B. In some embodiments, the devices 102 are provisioned with the SI applications 120 during manufacture. In other embodiments, the devices 102 are provisioned with the SI applications 120 prior to deployment. In other embodiments, the devices 102 are provisioned after deployment.

The SI application$_1$ 120A can generate and send resource queries 128A-128N (hereinafter referred to collectively as "queries 128" or individually as "query 128") to the SI applications 120B-120N to determine whether the participant devices 102B-102N have the resources 122A-122N sufficient to instantiate the VNFs 124A-124N. In response to the queries 128, the SI applications 120B-120N can generate and send resource query responses 130A-130N (hereinafter referred to collectively as "query responses 130" or individually as "query response 130") to the SI application$_1$ 120A to notify the SI application$_1$ 120A regarding whether the participant devices 102B-102N have the resources 122A-122N sufficient to instantiate the VNFs 124A-124N. In some instances, the query response 130 may include an indication that the resources 122 are not sufficient, in which case the SI application$_1$ 120A can ignore the associated device as a potential participant.

The SI application$_1$ 120A also can generate and send commands 132A-132N (hereinafter referred to collectively as "commands 132" or individually as "command 132") to the participant devices 102A-102N. The commands 132 can be used to instruct the participant devices 102A-102N to instantiate the VNFs 124A-124N. The commands 132 can be used to instruct the NREs 126A-126N of the any exclusionary data traffic characteristics. The commands 132 can be used to inform the network access device 104 of the MAIN_KEY and the participant devices 102B-102N of the VNF_KEY_N. The commands 132 can also include alerts, notifications, and other communications among the devices shown in FIG. 1.

Figure 2:
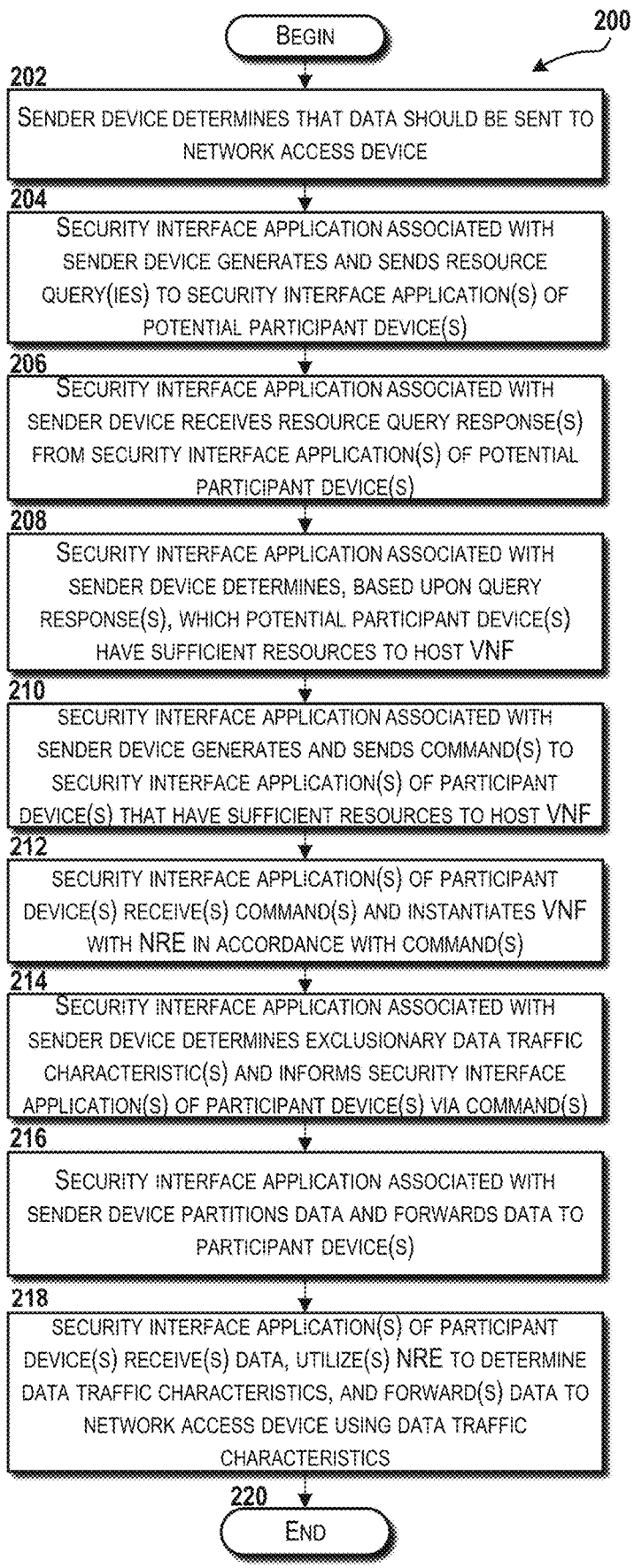
FIG. 2 is a flow diagram illustrating a method for obscuring device network mapping, according to an illustrative embodiment.

Turning now to FIG. 2, a method 200 performed for obscuring device network mapping will be described, according to an illustrative embodiment. It should be understood that the operations of the method disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors, or components thereof, and/or one or more other computing systems, network components, and/or devices disclosed herein, and/or virtualizations thereof, to perform operations.

For purposes of illustrating and describing some of the concepts of the present disclosure, the method 200 will be described as being performed, at least in part, by the sender device 102A and the participant devices 102B-102N via execution of the SI applications 120A-120N. It should be understood that additional and/or alternative devices can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the sender device 102A determines that the data 118 should be sent to the network access device 104. For example, the sender device 102A may want to send the data 118 to the service 108. This determination can be the result of the sender device 102A executing one or more IoT device applications 312 (shown in FIG. 3), which can generate the data 118.

From operation 202, the method 200 proceeds to operation 204. At operation 204, the SI application$_1$ 120A associated with the sender device 102A generates and sends one or more resource queries 128A-128N to one or more potential participant devices 102B-102N. The resource queries 128A-128N allow the sender device 102A to determine if the potential participant devices 102B-102N have sufficient resources 122A-122N to host the VNFs 124A-124N that contain the NREs 126A-126N. From operation 204, the method 200 proceeds to operation 206. At operation 206, the SI application$_1$ 120A receives the query response(s) 130 from the potential participant devices 102B-102N. From operation 206, the method 200 proceeds to operation 208. At operation 208, the SI application$_1$ 120A determines, based upon the query responses 130, which of the potential participant devices 102B-102N have sufficient resources 122A-122N to host the VNFs 124A-124N that contain the NREs 126A-126N. For ease of explanation, the remaining operations of the method 200 will be described in context of the sender device 102A receiving two query responses 130A, 130B that indicate two potential participant devices 102B, 102C have sufficient resources 122A, 122B to host the VNFs 124A, 124B that contain the NREs 126A, 126B. It should be understood, however, that the sender device 102A may receive any number of query responses 130 that indicate any number of potential participant devices 102B-102N have sufficient resources 122A-122N to host the VNFs 124A-124N that contain the NREs 126A-126N. As such, the example implementation of the method 200 should not be construed as being limiting in any way.

From operation 208, the method 200 proceeds to operation 210. At operation 210, the SI application$_1$ 120A generates and sends the commands 132A-132B to the SI applications 120B, 120C of the participant devices 102B, 102C. It is contemplated that the SI application$_1$ 120A may send one command 132 to each participant device 102B, 102C, or multiple commands 132 to each participant device 102B, 102C. It is also contemplated that each command 132 may contain one or more instructions. Initially, the commands 132 can instruct the SI applications 120B-120C of the participant devices 102B, 102C to instantiate the VNFs 124A, 124B with the NREs 126A, 126B. From operation 210, the method 200 proceeds to operation 212. At operation 212, the SI applications 120B, 120C of the participant devices 102B, 102C receive the commands 132A, 132B and instantiate the VNFs 124A, 124B with the NREs 126A, 126B in accordance with the commands 132A, 132B. In some embodiments, the method 200 can proceed directly to operation 218 described below. In other embodiments, the SI application$_1$ 120A may send additional commands 132 or include additional instructions in the commands 132A, 132B sent at operation 212.

From operation 212, the method 200 proceeds to operation 214. At operation 214, the SI application$_1$ 120A determines one or more exclusionary data traffic characteristics and informs the SI applications 120B, 120C of the participant devices 102B, 102C via the commands 132. The exclusionary data traffic characteristics can include specific values or ranges of data traffic characteristics that the NREs 126 should avoid. For example, the sender device 102A may inform the NREs 126 to avoid similar transmission delays that would have occurred if the sender device 102A had sent the data 118 directly to the network access device 104. The operation 214 may be performed simultaneously with the operation 210 such that a single command 132 is used. The operation 214 alternatively may be performed as an additional operation with new commands 132.

From operation 214, the method 200 proceeds to operation 216. At operation 216, the SI application 120A partitions the data 118 and forwards the data 118 to the participant devices 102B, 102C. The size of the partitions can be random or static (e.g., an equal 50/50 split between the two participant devices 102B, 102C). In addition, at operation 216, the SI application 120A can encrypt the data 118. For example, the SI application 120A can encrypt a first partition of the data 118 using a first encryption key and a second partition of the data 118 using a second encryption key.

From operation 216, the method 200 proceeds to operation 218. At operation 218, the SI applications 120B, 120C of the participant devices 102B, 102C receive the partitions of the data 118. Also at operation 218, the SI applications 120B, 120C of the participant devices 102B, 102C utilize the NREs 126A, 126B to determine data traffic characteristics for sending the data 118 to the network access device 104. The NREs 126 can create random data traffic characteristics to be applied to packets of the data 118. In this manner, packet transmission by each of the participant devices 102B, 102C can be changed so that packets of the data 118 experience random data traffic characteristics such as, for example, transmission delays, queuing delays, throughput changes, packet order changes, transmission power level changes, changes to other data traffic characteristics, combinations of any of the aforementioned data traffic characteristics, and the like. In some embodiments, the NREs 126 can take into account any exclusionary data traffic characteristics received from the sender device 102A via the commands 132. Also at operation 218, the SI applications 120B, 120C of the participant devices 102B, 102C can forward the data 118 to the network access device 104 using the data traffic characteristics. The network access device 104, in turn, can combine the partitions of the data 118, perform any decryption processes, and send the data 118 to the service 108 via the network 106.

From operation 218, the method 200 proceeds to operation 220. The method 200 can end at operation 220.

Figure 3:
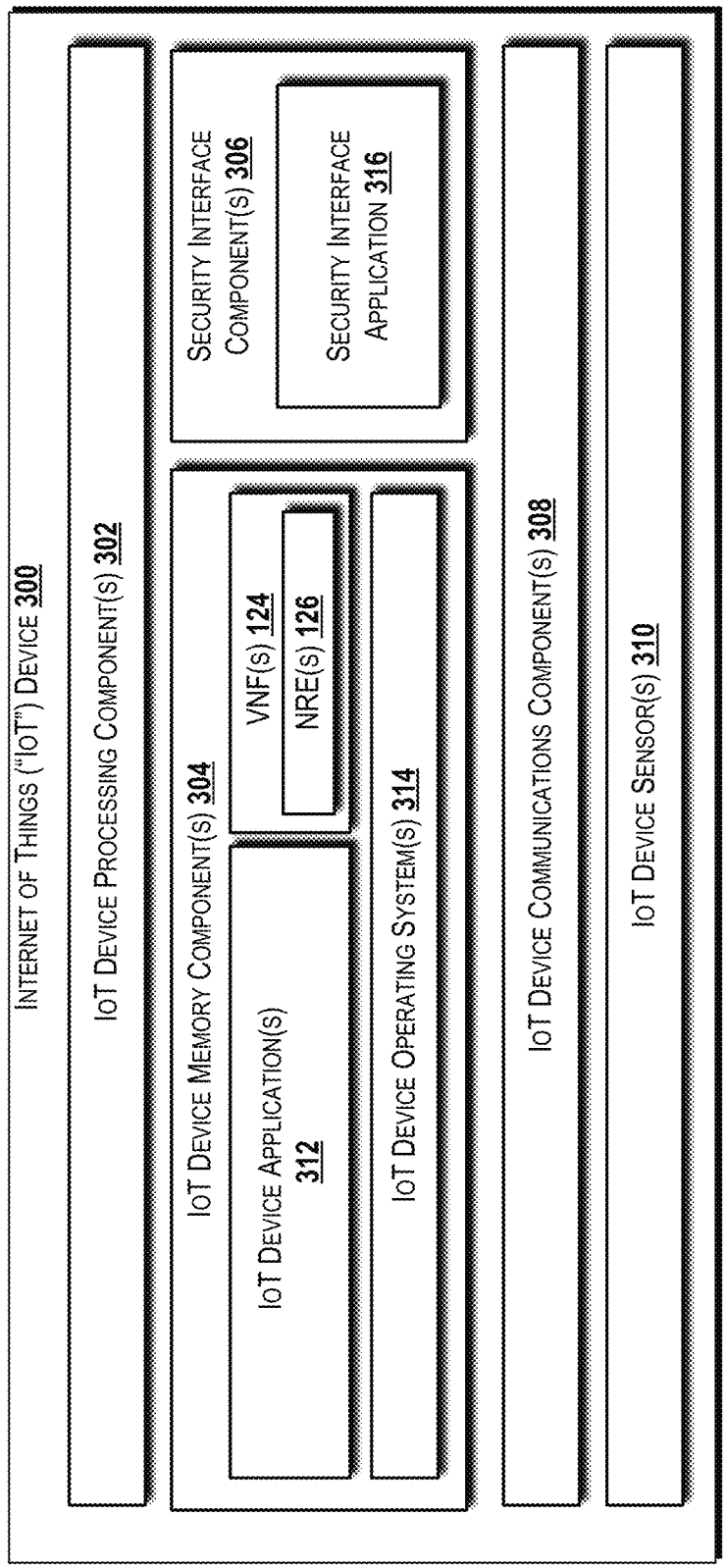
FIG. 3 is a block diagram illustrating an example IoT device capable of implementing aspects of the embodiments presented herein.

Turning now to FIG. 3, a block diagram illustrating aspects of an example IoT device 300 and components thereof capable of implementing aspects of the embodiments presented herein will be described. In some embodiments, one or more of the devices 102 are configured similar to or the same as the IoT device 300. While connections are not shown between the various components illustrated in FIG. 3, it should be understood that some, none, or all of the components illustrated in FIG. 3 can be configured to interact with one another to carry out various device functions. In some embodiments, the components are arranged so as to communicate via one or more busses (not shown). Thus, it should be understood that FIG. 3 and the following description are intended to provide a general understanding of a suitable environment in which various aspects of embodiments can be implemented, and should not be construed as being limiting in any way.

The illustrated IoT device 300 includes one or more IoT device processing components 302, one or more IoT device memory components 304, one or more security interface components 306, one or more IoT device communications components 308, and one or more IoT device sensors 310. The IoT device processing components 302 can include one or more hardware components that perform computations to process data, and/or to execute computer-executable instructions of one or more application programs such as one or more IoT device application(s) 312, one or more IoT device operating system(s) 314, one or more security interface application(s) 316, the VNF(s) 124 containing the NRE(s) 126, and/or other software. The IoT device processing component(s) 302 can include one or more CPUs configured with one or more processing cores. The IoT device processing component(s) 302 can include one or more GPU configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the IoT device processing component(s) 302 can include one or more discrete GPUs. In some other embodiments, the IoT device processing component(s) 302 can include CPU and GPU components that are configured in accordance with a co-processing CPU/GPU computing model, wherein the sequential part of an application executes on the CPU and the computationally-intensive part is accelerated by the GPU. The IoT device processing component(s) 302 can include one or more system on a chip ("SoC") components along with one or more other components illustrated as being part of the IoT device 300, including, for example, the IoT device memory component 304, the IoT device communications component(s) 308, the IoT device sensor(s) 310, or some combination thereof. In some embodiments, the IoT device processing component(s) 302 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more OMAP SoCs, available from TEXAS INSTRUMENTS of Dallas, Tex.; one or more customized versions of any of the above SoCs; and/or one or more proprietary SoCs. The IoT device processing component(s) 302 can be or can include one or more hardware components architected in accordance with an ARM architecture, available for license from ARM HOLDINGS of Cambridge, United Kingdom. Alternatively, the IoT device processing component(s) 302 can be or can include one or more hardware components architected in accordance with an x86 architecture, such an architecture available from INTEL CORPORATION of Mountain View, Calif., and others. Those skilled in the art will appreciate the implementation of the IoT device processing component(s) 302 can utilize various computation architectures, and as such, the IoT device processing component(s) 302 should not be construed as being limited to any particular computation architecture or combination of computation architectures, including those explicitly disclosed herein.

The IoT device memory component(s) 304 can include one or more hardware components that perform storage operations, including temporary or permanent storage operations. In some embodiments, the IoT device memory component(s) 304 can include volatile and/or non-volatile memory implemented in any method or technology for storage of information such as computer-readable instructions, data structures, program modules, the IoT device operating system(s) 314, the IoT device application(s) 312, the VNF(s) 124, the NRE(s) 126, the data 118, combinations thereof, and/or other data disclosed herein. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store data and which can be accessed by the IoT device processing component(s) 302.

The IoT device application(s) 312 can be executed by the IoT device processing component(s) 302 to perform various IoT operations. For example, the IoT device application(s) 312 can instruct the IoT device sensor(s) 310 to collect data and share the data with the service(s) 108. The IoT device application(s) 312 can execute on top of the IoT device operating system(s) 314. In some embodiments, the IoT device application(s) 312 can be provided as firmware.

The IoT device operating system(s) 314 can control the operation of the IoT device 300. In some embodiments, the IoT device operating system(s) 314 includes the functionality of the IoT device application(s) 312. The IoT device operating system(s) 314 can be executed by the IoT device processing component(s) 302 to cause the IoT device 300 to perform various operations. The IoT device operating system(s) 314 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The IoT device sensor(s) 310 can include any sensor type or combination of sensor types utilizing any known sensor technology that is capable of detecting one or more characteristics of an environment in which the IoT device 300 is deployed. More particularly, the IoT device sensor(s) 310 can include, but are not limited to, lighting control sensor, appliance control sensor, security sensor, alarm sensor, medication dispenser sensor, entry/exit detector sensor, video sensor, camera sensor, alarm sensor, motion detector sensor, door sensor, window sensor, window break sensor, outlet control sensor, vibration sensor, occupancy sensor, orientation sensor, water sensor, water leak sensor, flood sensor, temperature sensor, humidity sensor, smoke detector sensor, carbon monoxide detector sensor, doorbell sensor, dust detector sensor, air quality sensor, light sensor, gas sensor, fall detector sensor, weight sensor, blood pressure sensor, IR sensor, HVAC sensor, smart home sensor, thermostats, other security sensors, other automation sensors, other environmental monitoring sensors, other healthcare sensors, multipurpose sensor that combines two or more sensors, the like, and/or combinations thereof. Those skilled in the art will appreciate the applicability of the IoT device sensors 310 to various aspects of the services 108, and for this reason, additional details in this regard are not provided.

The security interface component(s) 306 can be a stand-alone component of the IoT device 300 as shown. The security interface component(s) 306 can include the security interface application(s) 316. In some embodiments, the security interface component(s) 306 can be or can include a secure element. Alternatively, the security interface component(s) 306 can be integrated into another component of the IoT device 300, such as the IoT device processing component(s) 302. In some embodiments, the security interface component(s) 306 can be part of an SoC that also includes, for example, the IoT device processing component(s) 302, the IoT device memory component(s) 304, the IoT device communications component(s) 308, the IoT device sensor(s) 310 also may be integrated as part of the SoC, or some combination thereof. The security interface component(s) 306 can execute the SI application 120 to perform operations described herein.

The IoT device communications component(s) 308 can include an RF transceiver or separate receiver and transmitter components. The IoT device communications component 308 can include one or more antennas and one or more RF receivers for receiving RF signals from and one or more RF transmitters for sending RF signals to other IoT devices 300 (e.g., the devices 102) and the network access device 104. It is contemplated that the IoT device communications component(s) 308 also may include a wired connection to a backbone network (not shown in FIG. 1).

Figure 4:
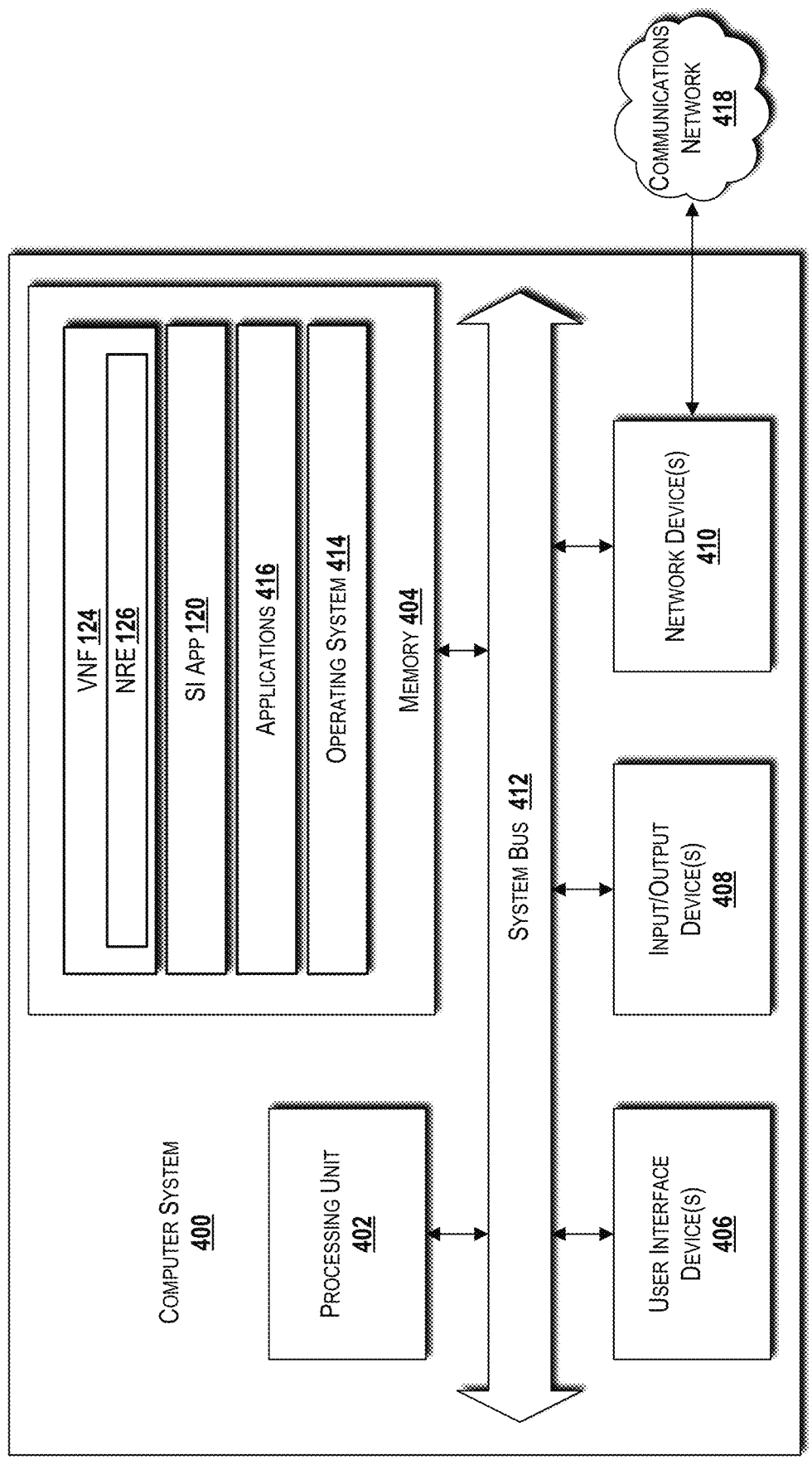
FIG. 4 is a block diagram illustrating an example computer system capable of implementing aspects of the embodiments presented herein.

Turning now to FIG. 4, a computer system 400 and components thereof will be described. An architecture similar to or the same as the computer system 400 can be used to implement various systems/devices disclosed herein, such as one or more of the devices 102, the malicious device 110, one or more systems associated with the network 106, one or more systems that provide, at least in part, the service(s)

108, and/or other systems that can be used along with or in support of the concepts and technologies disclosed herein.

The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410.

The processing unit 402 might be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system 414 and one or more applications 416. The memory 404 in the illustrated example can include the VNF 124 containing the NRE 126 and the SI application 120. Although not shown in the illustrated example, the SI application 120 can be provided in an isolated, independent component such as a secure element.

The operating system 414 can include, but is not limited to, members of the WINDOWS family of operating systems from MICROSOFT CORPORATION, the LINUX family of operating systems, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer. An I/O device 408 embodied as a display screen can be used to present information.

The network devices 410 enable the computer system 400 to communicate with a communications network 418, which can include the network 106. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Turning now to FIG. 5, an illustrative mobile device 500 and components thereof will be described. In some embodiments, one or more of the devices 102 and/or the malicious device 110 described herein can be configured similar to or the same as the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. In the illustrated example, the applications 510 can include the VNF 124 containing the NRE 126 and the SI application 120. In some embodiments, the SI application 120 can be stored in and executed by a secure element. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks, such as the network 106, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 535 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the IoT device 300 and the computer system 400 described above with reference to FIGS. 3 and 4, respectively. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Turning now to FIG. 6, details of the network 106 are illustrated, according to an illustrative embodiment. The illustrated network 106 includes a cellular network 602, a packet data network 604, and a circuit switched network 606 (e.g., a public switched telephone network). The cellular network 602 can include various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, one or more of the devices 102, the malicious device 110, the mobile device 500, a cellular telephone, a user equipment, a PDA, a laptop computer, a handheld computer, and combinations thereof, can be operatively connected to the cellular network 602. The mobile communications device 608 can be configured similar to or the same as the mobile device 600 described above with reference to FIG. 5.

The cellular network 602 can be configured as a GSM network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with 4G mobile communications standards such as LTE, 5G mobile communications standards, or the like, as well as evolved and future mobile standards.

The packet data network 604 includes various systems, devices, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet.

The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610 such as a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Based on the foregoing, it should be appreciated that concepts and technologies for device network mapping obscuration have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

The invention claimed is:
1. A method comprising:
   determining, by a sender device comprising a processor executing an application, that data associated with the application is to be sent to a service via a network, wherein the network is accessible by the sender device via a network access device;
   in response to determining that the data associated with the application is to be sent to the service via the network, generating, by a first security interface application associated with the sender device, a first resource query directed to a first participant device and a second resource query directed to a second participant device, wherein the first resource query causes the first participant device to respond with a first resource query response indicating whether the first participant device has a first resource capable of hosting a first virtual network function, and wherein the second resource query causes the second participant device to respond with a second resource query response indicating whether the second participant device has a second resource capable of hosting a second virtual network function;
   sending, by the sender device via the first security interface application, the first resource query to the first participant device and the second resource query to the second participant device;
   receiving, by the sender device via the first security interface application, the first resource query response indicating that the first participant device has the first resource capable of hosting the first virtual network function and the second resource query response indi- cating that the second participant device has the second resource capable of hosting the second virtual network function;

generating, by the first security interface application, a first command directed to a second security interface application associated with the first participant device and a second command directed to a third security interface application associated with the second participant device, wherein the first command instructs the first participant device to instantiate the first virtual network function using the first resource and the second command instructs the second participant device to instantiate the second virtual network function using the second resource;

sending, by the sender device via the first security interface application, the first command to the first participant device and the second command to the second participant device, wherein the first participant device instantiates the first virtual network function in accordance with the first command, and wherein the second participant device instantiates the second virtual network function in accordance with the second command;

partitioning, by the first security interface application, the data into a first data partition directed to the first participant device and a second data partition directed to the second participant device; and sending, by the sender device via the first security interface application, the first data partition to the first virtual network function of the first participant device and the second data partition to the second virtual network function of the second participant device, wherein the first participant device forwards, via the first virtual network function, the first data partition to the network access device, wherein the second participant device forwards, via the second virtual network function, the second data partition to the network access device, and wherein the network access device combines the first data partition and the second data partition and sends the data to the service via the network.

2. The method of claim 1, wherein the first command further instructs the first participant device to instantiate a first network randomizer engine in the first virtual network function; and wherein the second command further instructs the second participant device to instantiate a second network randomizer engine in the second virtual network function.

3. The method of claim 2, further comprising:
determining, by the first security interface application, an exclusionary data traffic characteristic, wherein the exclusionary data traffic characteristic instructs the first network randomizer engine and the second network randomizer engine to exclude a data traffic characteristic; and sending, by the sender device via the first security interface application, the exclusionary data traffic characteristic to the first network randomizer engine and the second network randomizer engine.

4. The method of claim 1, further comprising encrypting, by the first security interface application, the first data partition and the second data partition prior to sending.

5. The method of claim 4, wherein encrypting, by the first security interface application, the first data partition and the second data partition prior to sending comprises encrypting, by the first security interface application, the first data partition using a first key and the second data partition using a second key.

6. The method of claim 5, further comprising providing, by the first security interface application, the first key to the second security interface application and the second key to the third security interface application.

7. A computer-readable storage medium comprising computer-executable instructions of a first security interface application that, when executed by a processor of a sender device, cause the processor to perform operations comprising:

determining that data associated with an application is to be sent to a service via a network, wherein the network is accessible by the sender device via a network access device;

in response to determining that the data associated with the application is to be sent to the service via the network, generating a first resource query directed to a first participant device and a second resource query directed to a second participant device, wherein the first resource query causes the first participant device to respond with a first resource query response indicating whether the first participant device has a first resource capable of hosting a first virtual network function, and wherein the second resource query causes the second participant device to respond with a second resource query response indicating whether the second participant device has a second resource capable of hosting a second virtual network function;

sending the first resource query to the first participant device and the second resource query to the second participant device;

receiving the first resource query response indicating that the first participant device has the first resource capable of hosting the first virtual network function and the second resource query response indicating that the second participant device has the second resource capable of hosting the second virtual network function;

generating a first command directed to a second security interface application associated with the first participant device and a second command directed to a third security interface application associated with the second participant device, wherein the first command instructs the first participant device to instantiate the first virtual network function using the first resource and the second command instructs the second participant device to instantiate the second virtual network function using the second resource;

sending the first command to the first participant device and the second command to the second participant device, wherein the first participant device instantiates the first virtual network function in accordance with the first command, and wherein the second participant device instantiates the second virtual network function in accordance with the second command;

partitioning the data into a first data partition directed to the first participant device and a second data partition directed to the second participant device; and sending the first data partition to the first virtual network function of the first participant device and the second data partition to the second virtual network function of the second participant device, wherein the first participant device forwards, via the first virtual network function, the first data partition to the network access device, wherein the second participant device forwards, via the second virtual network function, the second data partition to the network access device, and wherein the network access device combines the first data partition and the second data partition and sends the data to the service via the network.

8. The computer-readable storage medium of claim 7, wherein the first command further instructs the first participant device to instantiate a first network randomizer engine in the first virtual network function; and wherein the second command further instructs the second participant device to instantiate a second network randomizer engine in the second virtual network function.

9. The computer-readable storage medium of claim 8, wherein the operations further comprise:
determining an exclusionary data traffic characteristic, wherein the exclusionary data traffic characteristic instructs the first network randomizer engine and the second network randomizer engine to exclude a data traffic characteristic; and
sending the exclusionary data traffic characteristic to the first network randomizer engine and the second network randomizer engine.

10. The computer-readable storage medium of claim 7, wherein the operations further comprise encrypting the first data partition and the second data partition prior to sending.

11. The computer-readable storage medium of claim 10, wherein encrypting the first data partition and the second data partition prior to sending comprises encrypting the first data partition using a first key and the second data partition using a second key.

12. The computer-readable storage medium of claim 11, wherein the operations further comprise providing the first key to the second security interface application and the second key to the third security interface application.

13. A sender device comprising:
a processor; and
a memory comprising computer-executable instructions of a first security interface application that, when executed by the processor, cause the processor to perform operations comprising:
determining that data associated with an application is to be sent to a service via a network, wherein the network is accessible by the sender device via a network access device,
in response to determining that the data associated with the application is to be sent to the service via the network, generating a first resource query directed to a first participant device and a second resource query directed to a second participant device, wherein the first resource query causes the first participant device to respond with a first resource query response indicating whether the first participant device has a first resource capable of hosting a first virtual network function, and wherein the second resource query causes the second participant device to respond with a second resource query response indicating whether the second participant device has a second resource capable of hosting a second virtual network function,
sending the first resource query to the first participant device and the second resource query to the second participant device,
receiving the first resource query response indicating that the first participant device has the first resource capable of hosting the first virtual network function and the second resource query response indicating that the second participant device has the second resource capable of hosting the second virtual network function,
generating a first command directed to a second security interface application associated with the first participant device and a second command directed to a third security interface application associated with the second participant device, wherein the first command instructs the first participant device to instantiate the first virtual network function using the first resource and the second command instructs the second participant device to instantiate the second virtual network function using the second resource,
sending the first command to the first participant device and the second command to the second participant device, wherein the first participant device instantiates the first virtual network function in accordance with the first command, and wherein the second participant device instantiates the second virtual network function in accordance with the second command,
partitioning the data into a first data partition directed to the first participant device and a second data partition directed to the second participant device, and
sending the first data partition to the first virtual network function of the first participant device and the second data partition to the second virtual network function of the second participant device, wherein the first participant device forwards, via the first virtual network function, the first data partition to the network access device, wherein the second participant device forwards, via the second virtual network function, the second data partition to the network access device, and wherein the network access device combines the first data partition and the second data partition and sends the data to the service via the network.

14. The sender device of claim 13, wherein the first command further instructs the first participant device to instantiate a first network randomizer engine in the first virtual network function; and wherein the second command further instructs the second participant device to instantiate a second network randomizer engine in the second virtual network function.

15. The sender device of claim 14, wherein the operations further comprise:
determining an exclusionary data traffic characteristic, wherein the exclusionary data traffic characteristic instructs the first network randomizer engine and the second network randomizer engine to exclude a data traffic characteristic; and
sending the exclusionary data traffic characteristic to the first network randomizer engine and the second network randomizer engine.

16. The sender device of claim 13, wherein the operations further comprise encrypting the first data partition and the second data partition prior to sending.

17. The sender device of claim 16, wherein encrypting the first data partition and the second data partition prior to sending comprises encrypting the first data partition using a first key and the second data partition using a second key.

18. The sender device of claim 17, wherein the operations further comprise providing the first key to the second security interface application and the second key to the third security interface application.

19. The sender device of claim 13, further comprising a security interface component, wherein the security interface component comprises the processor and the memory comprising the computer-executable instructions of the first security interface application.

20. The sender device of claim 19, further comprising:
a device processor; and
a device memory comprising computer-executable instructions of the application that, when executed by the device processor, cause the device processor to generate the data.

* * * * *